(12) United States Patent
Cheng et al.

(10) Patent No.: US 11,454,594 B2
(45) Date of Patent: Sep. 27, 2022

(54) METHOD FOR IDENTIFYING FROSTBITE CONDITION OF GRAIN SEEDS USING SPECTRAL FEATURE WAVEBANDS OF SEED EMBRYO HYPERSPECTRAL IMAGES

(71) Applicant: ZHEJIANG UNIVERSITY, Zhejiang (CN)

(72) Inventors: Fang Cheng, Zhejiang (CN); Jun Zhang, Zhejiang (CN); Limin Dai, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 476 days.

(21) Appl. No.: 16/615,819

(22) PCT Filed: Mar. 12, 2019

(86) PCT No.: PCT/CN2019/077830
§ 371 (c)(1),
(2) Date: Nov. 22, 2019

(87) PCT Pub. No.: WO2019/174572
PCT Pub. Date: Sep. 19, 2019

(65) Prior Publication Data
US 2020/0150051 A1    May 14, 2020

(30) Foreign Application Priority Data
Mar. 12, 2018    (CN) .................. 201810201564.X

(51) Int. Cl.
*G01N 21/88* (2006.01)
*G01N 21/31* (2006.01)
*G01N 21/84* (2006.01)

(52) U.S. Cl.
CPC ......... *G01N 21/8851* (2013.01); *G01N 21/31* (2013.01); *G01N 2021/8466* (2013.01);
(Continued)

(58) Field of Classification Search
CPC ... G01N 2021/8466; G01N 2021/8854; G01N 2021/8887; G01N 21/31; G01N 21/85; G01N 21/8851; G01N 21/84
(Continued)

(56) References Cited

U.S. PATENT DOCUMENTS

2008/0037002 A1    2/2008  Wright
2012/0228199 A1    9/2012  Modiano et al.
2014/0050365 A1    2/2014  Conrad et al.

FOREIGN PATENT DOCUMENTS

CN    102072883    5/2011
CN    102621077    8/2012
(Continued)

OTHER PUBLICATIONS

"International Search Report (Form PCT/ISA/210) of PCT/CN2019/077830", dated Jun. 18, 2019, with English translation thereof, pp. 1-5.

*Primary Examiner* — Tri T Ton
(74) *Attorney, Agent, or Firm* — JCIP Global Inc.

(57) ABSTRACT

The invention discloses a method for identifying frostbite condition of grain seeds using the spectral feature wavebands of the grain seed embryo hyperspectral images. At first, hyperspectral image of the grain seed in the embryo side is collected, and the hyperspectral image in the embryo region of the grain seed is obtained. Then the average spectra is calculated and the wavebands containing noise are eliminated, the spectral feature wavebands are extracted by using related algorithm and the spectra value corresponding with the waveband is obtained. Next, the feature waveband spectral value and the category label of the known frostbite category grain seed are input into the classification model for obtaining the optimal training classification model. Finally, the feature waveband spectral value of each
(Continued)

unknown frostbite category grain seed is input into the established model, the frostbite condition of seed is identified.

9 Claims, 4 Drawing Sheets

(52) U.S. Cl.
　　　CPC ................ *G01N 2021/8854* (2013.01); *G01N 2021/8887* (2013.01)

(58) Field of Classification Search
　　　USPC ....................................... 382/110; 356/54–67
　　　See application file for complete search history.

(56) References Cited

FOREIGN PATENT DOCUMENTS

| | | |
|---|---|---|
| CN | 104062239 | 9/2014 |
| CN | 104406928 | 3/2015 |
| CN | 105678342 | 6/2016 |
| CN | 105931223 | 9/2016 |
| CN | 108444928 | 8/2018 |
| KR | 101341815 | 1/2014 |

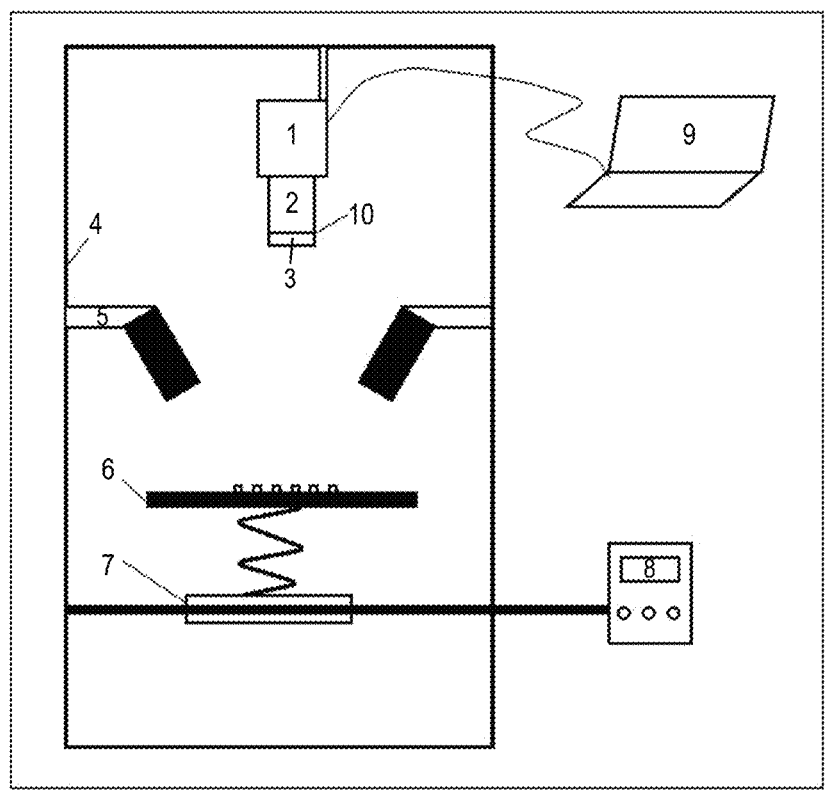
FIG. 2
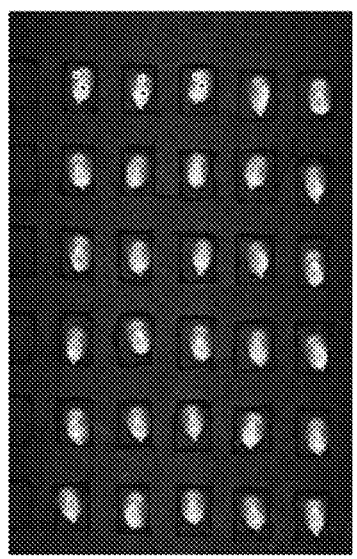   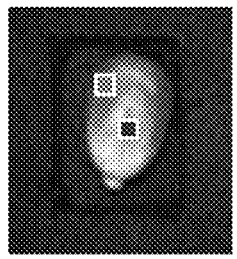
FIG. 3A          FIG. 3B

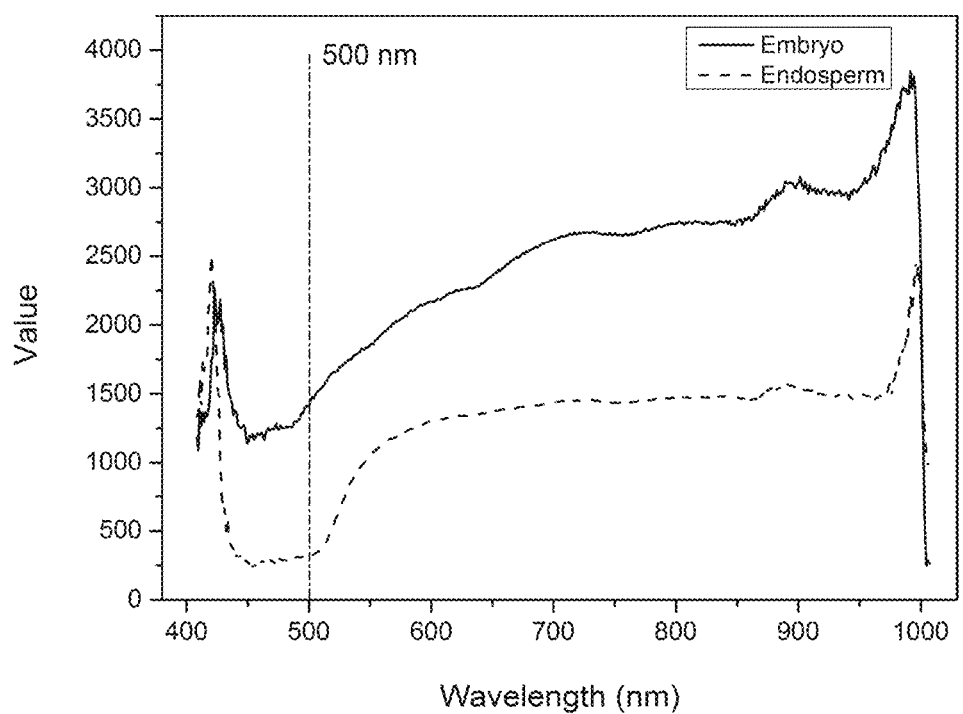
FIG. 4
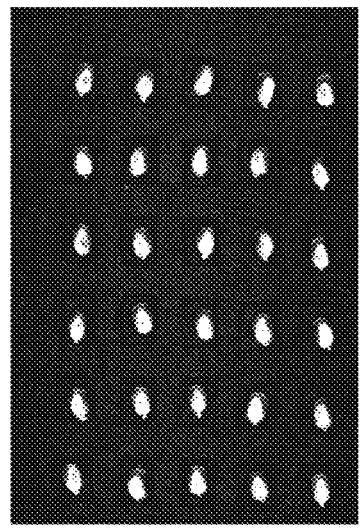 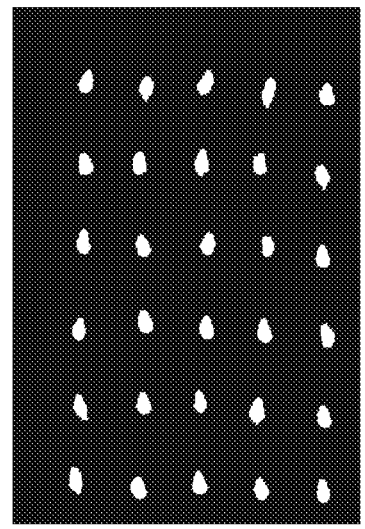
FIG. 5A        FIG. 5B

METHOD FOR IDENTIFYING FROSTBITE CONDITION OF GRAIN SEEDS USING SPECTRAL FEATURE WAVEBANDS OF SEED EMBRYO HYPERSPECTRAL IMAGES

CROSS-REFERENCE TO RELATED APPLICATION

This application is a 371 of international application of PCT application serial no. PCT/CN2019/077830, filed on Mar. 12, 2019, which claims the priority benefit of China application no. 201810201564.X, filed on Mar. 12, 2018. The entirety of each of the above mentioned patent applications is hereby incorporated by reference herein and made a part of this specification.

TECHNICAL FIELD

The invention relates to an image detecting method in the technical field of non-destructive testing of agricultural products (grain seeds), in particular to a method for identifying frostbite condition of grain seeds using feature wavebands of seed embryo hyperspectral images.

BACKGROUND

As the basis of agricultural production, the quality of seed is an important factor to ensure the agricultural harvest. In order to ensure the national food security, the quality of the seed must be tested.

Seed freezing damage often occurs in the middle- and high-latitude northern seed production areas and is a kind of agricultural disaster. When the seeds are frozen, the quality of the seeds is degraded. It is easy to cause mildew when the seeds are stored in the later stage. When the seeds are germinated, the vigor of the seed is reduced, which will have different degrees of influence to the growth of the germ and radicle. Seeds that have suffered from low temperature freezing will cause changes in the internal components, which have a great impact on the subsequent germination, root growth, growth and development of the seed.

The seed is composed of three parts: embryo, endosperm and seed coat. Since the seed embryo contains a lot of nutrients, it can develop into the root, stem and leaf of the plant, which is the most important part of the seed. If the embryo is damaged, it has the greatest impact on the subsequent development of the plant.

Due to the influence of multiple factors, whether the seeds are subjected to freezing damage and their frostbite conditions, with accurate classification to the seeds, it will help the storage, germination, growth and development of the seeds in the later stage. Therefore, how to quickly and accurately obtain some of the characteristics of the seed and determine the frostbite of the seed (especially the slight frost damage seed) has become a key factor in the study of seed frostbite and provide guidance for agricultural production of seeds. Moreover, when judging the frostbite of seeds, it is more important to study the freezing damage of the embryos.

At present, hyperspectral imaging technology is more and more widely used in non-destructive testing of agricultural products. It combines the advantages of traditional image technology and spectroscopy technology, which can extract the image and spectral information of the object at the same time. It can also obtain the spectral information of each pixel on the acquired image, which can effectively analyze the chemical composition of each part of the seed, so as to avoiding the instability of the experimental results due to uneven distribution of seed characteristics. At present, there are some reports on the use of remote sensing hyperspectral imaging technology to study the freezing damage of crops in the field, however, due to different technical means and objects, it cannot be used for seed frostbite condition identification.

CONTENT OF THE INVENTION

In order to solve the problems described in the background, the object of the present invention is to provide a method for identifying frostbite condition of grain seeds using the spectral feature waveband of the seed embryo hyperspectral images. By collecting the hyperspectral image of the grain seeds to be tested, the grain seeds are classified into three categories: normal, slight frostbite and severe frostbite, which have the advantages of non-destructive and good classification performance, and solve the demand for frostbite classification and detection of grain seed.

The steps of the method of the present invention are as follows.

1) Collect the hyperspectral image in an embryo side of the grain seed, which composed of gray images of different wavebands.

2) Obtain the embryo hyperspectral image of the grain seed by processing the collected hyperspectral image.

3) Obtain an average value of each of the gray image in an embryo region of the grain seed, form an average spectra with different wavebands, eliminate the wavebands with noise in the average spectra, and use a successive projection algorithm (SPA algorithm) to extract the feature wavebands and obtain the corresponding spectral value of the average spectra.

The feature wavebands are part of the wavebands used in the step 1).

4) Divide the grain seeds with known frostbite category into multiple batches, repeating each of the above steps 1) to 2) to obtain the feature wavebands of the grain seeds and their corresponding spectral values, and then input them into a classification model for obtaining an optimal training classification model.

5) Repeating the above steps 1) to 2) to obtain the feature wavebands and their corresponding spectral values of the grain seed with unknown category, and then inputting it into the optimal trained classification model to obtain the frostbite category of the grain seed.

Specific embodiment is to select the first n feature wavebands input classification model.

Specifically, in step 1, the embryo side of the grain seed is facing up with a light source, and the gray images of the grain seed in K wavebands are collected by a camera, wherein a gray image corresponds to a waveband and the K-gray images are composed of a hyperspectral image. K is a positive integer.

Specifically, in step 1), the embryo side of the grain seed is irradiated with two line tungsten halogen lamps to collect the hyperspectral image.

Specifically, in step 2):

2.1) Extract the embryo region and an endosperm region of the grain seed in the hyperspectral image as a region of interest, and calculating an average spectral value of all pixels in the region of interest in each of the gray image.

2.2) Compare the average spectral values of the embryo region and the endosperm region in the same gray image, selecting a gray image whose two average spectral values differs by more than 1000 and the gray value of the embryo region is greater than 0.75 and the gray value of the endosperm region is less than 0.2.

2.3) Obtain a binary image containing only the embryo region of the grain seed using image processing methods, and the hyperspectral image of the embryo side of the grain seed obtained in the step 1) is masked by the binary image, thus obtain an embryo hyperspectral image.

Specifically, in step 2.3), the image processing methods comprises threshold segmentation, noise elimination, and close operations performed in sequence.

Specifically, in step 3), the spectral range after the noise wavebands of the gray image being removed from the hyperspectral image is 432.23-985.37 nm.

Specifically, in step 4), the classification model is a Linear SVM classification model.

The frostbite condition of the grain seeds is classified into three categories: normal, slight frostbite and severe frostbite.

The frostbite of the grain seed is determined according to a germination rate, if a grain seed batch has a germination rate of more than 85%, the grain seed batch is classified into a normal category; if the grain seed batch has the germination rate of 51-84%, the grain seed batch is classified into a slight frostbite category; if the grain seed batch has the germination rate lower than 50%, the grain seed batch is classified into a severe frostbite category.

The invention obtains the feature wavebands by extracting the embryo region hyperspectral image from the grain seed hyperspectral image, and creatively establishes a classification model for the feature wavebands of the embryo hyperspectral image and the frostbite condition of the grain seed. The frostbite condition test results of grain seeds are obtained.

The beneficial effects of the invention are the following.

In view of the fact that there are few dynamic identification methods for grain seeds, the present invention selects gray images in specific wavebands, uses image processing method to extract grain seed embryo region, and uses the embryo spectra information to realize the classification detection of grain seed frostbite condition. A certain classification model is established to predict the frostbite condition of single grain seeds in batches, and the grain seeds are divided into three categories: normal, slight frostbite and severe frostbite.

In this embodiment, the hyperspectral image of the grain seed embryo is obtained by using the image processing method. By using related algorithm to extract the feature wavebands of the spectra in the embryo region, the classification model is established, which has high precision and a good classification performance on the detection of seed frostbite condition.

DRAWINGS

FIG. 2 is a device structure according to a specific embodiment of the present invention.

FIGS. 3A and 3B are schematic diagrams of selecting the region of interest of a corn seed hyperspectral image; FIG. 3A is a figure of a region of interest selected in a hyperspectral image, and FIG. 3B is a figure of a region of interest of a corn seed in the first upper left position.

FIG. 4 is average spectra of the selected embryo region and endosperm region, wherein the maximum spectral value difference in the figure is at 500 nm waveband.

FIG. 5A is a gray image of corn seeds at 500 nm waveband.

FIG. 5B is a binary image including only the embryo region after image processing of the gray image shown in FIG. 5A.

Figure 1:
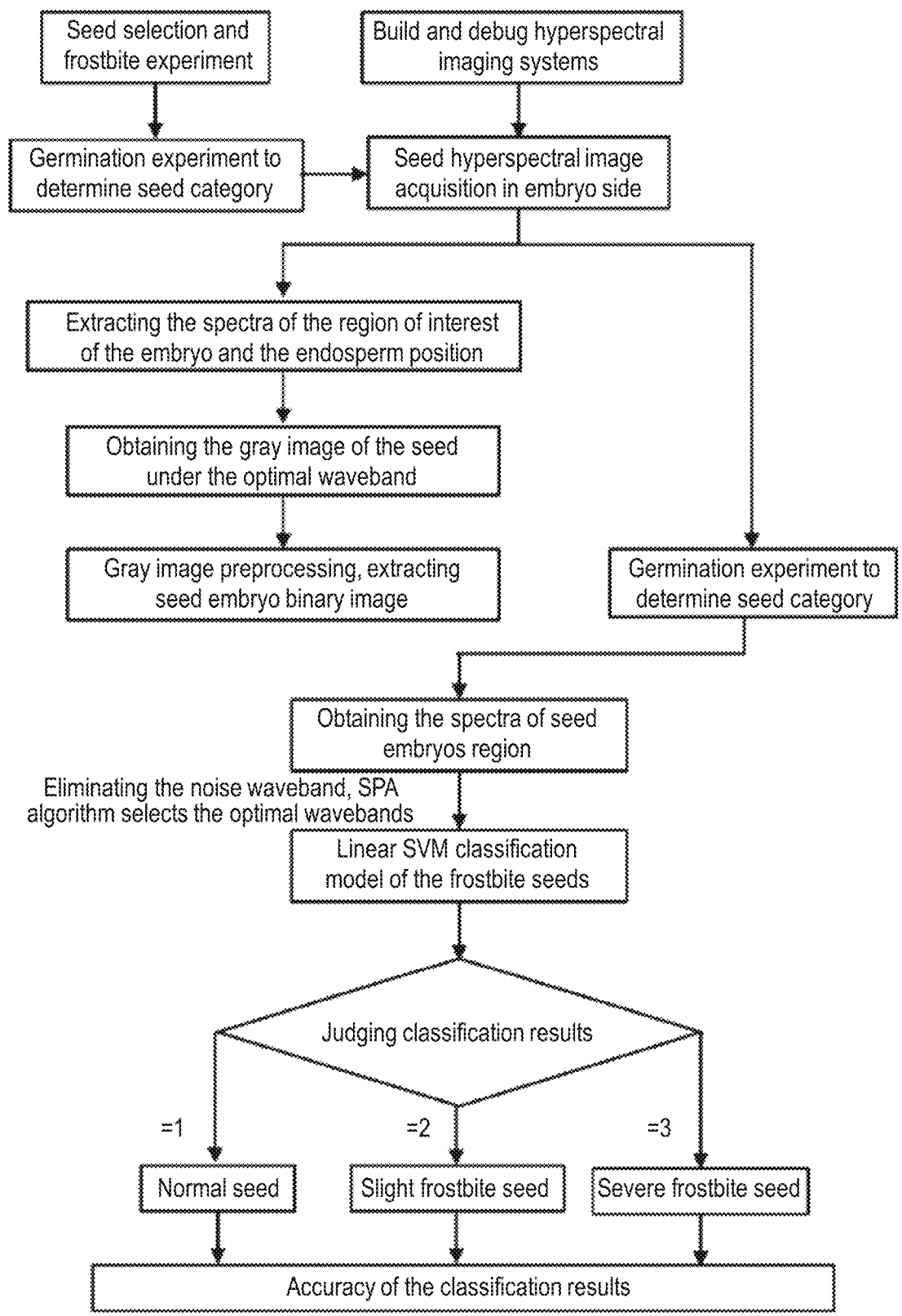
FIG. 1 is a flow chart of the method of the present invention.

In the figures: 1. CCD camera, 2. visible/near infrared imaging spectrometer, 3. lens, 4. black box, 5. line sources, 6. liftable sample stage, 7. mobile platform, 8. mobile platform controller, 9. computer, 10. 0.5 mm extension tube.

SPECIFIC EMBODIMENT

The present invention will be further described in detail below with reference to the drawings and specific embodiment. However, the embodiment of the invention is not limited thereto.

The embodiment of the invention is as follows.

In the embodiment of the present invention, corn seeds are used as research objects.

The variety of the corn seed used in the present invention is Hai He 78. The germination experiment of corn seeds is carried out by using the method provided by Chinese National Standard GB/T3543.4-1995, wherein the seeds have suffered a certain frostbite in advance. When germination rate of a batch of corn seed is higher than 85%, it is regarded as normal category (set as label 1); when germination rate of a batch of corn seed is between 50% and 84%, it is regarded as a slight frostbite category (set as label 2); when the germination rate of corn seeds is less than 50%, it is considered to be severe frostbite category (set as label 3).

In this embodiment, the hyperspectral imaging device comprises CCD camera 1, visible/near infrared imaging spectrometer 2, lens 3, dark box 4, line sources 5, liftable sample stage 6, mobile platform 7, mobile platform controller 8, computer 9 and 0.5 mm extension tube 10.

The CCD camera 1, the visible/near infrared imaging spectrometer 2, the lens 3, the line sources 5, the liftable sample stage 6, the mobile platform 7 and the 0.5 mm extension tube 10 are all placed in the dark box 4. The mobile platform 7 is installed at the bottom of the black box 4, and is connected to the mobile platform controller 8. The top surface of the mobile platform 7 is provided with the liftable sample stage 6, and the corn seeds are placed on the liftable sample stage 6. The line sources 5 are mounted on the side of the dark box 4 above the sample stage 6. The two line sources 5 are inclined downwardly shining toward the corn seed.

The CCD camera 1, the visible/near infrared imaging spectrometer 2, and the lens 3 are mounted on the top surface of the dark box 4 directly above the liftable sample stage 6. The CCD camera 1, the visible/near infrared imaging spectrometer 2 and the lens 3 are connected to each other vertically and mounted above the sample stage 6. An extension tube with 0.5 mm thickness is placed between the lens 3 and the visible/near infrared spectrometer 2. After the extension tube is added, the final image of the corn is enlarged (equivalent to the closer the human eye is to the object, the larger the object when looking at the object), and a clearer corn seed hyperspectral image is obtained.

The line sources 5 adopts tungsten halogen lamp. Two tungsten halogen lamps are symmetrically placed 26 cm above the mobile platform 7 to provide stable and uniform diffuse reflection light for the corn seeds. The angle between the two tungsten halogen lamps is 60 degrees. The specific embodiment also includes a cardboard with a black background and engraved with a number of small grooves (the length is a, the width is b, the depth is c), and one corn seed is placed in each of the small groove of the cardboard.

The spectral imaging unit comprises the lens (V23-f/2.4 030603), the visible/near-infrared imaging spectrometer (Imspector V10E-QE, Spectral Imaging Ltd., Oulu, Finland, spectral range 400-1000 nm), the CCD camera (C8484-05G), which is mounted vertically at 28.5 cm above the mobile platform. The visible/near-infrared spectrometer is connected to the CCD camera and computer to capture the image of the corn seeds on a sample holder. The hyperspectral imaging data cube is transmitted to the computer at high speed. After a hyperspectral image acquisition process, with calculation, the final hyperspectral imaging data cube contains images of 477 wavebands. The computer is used for image acquisition, processing, analysis and display.

Figures 7A, 7B:
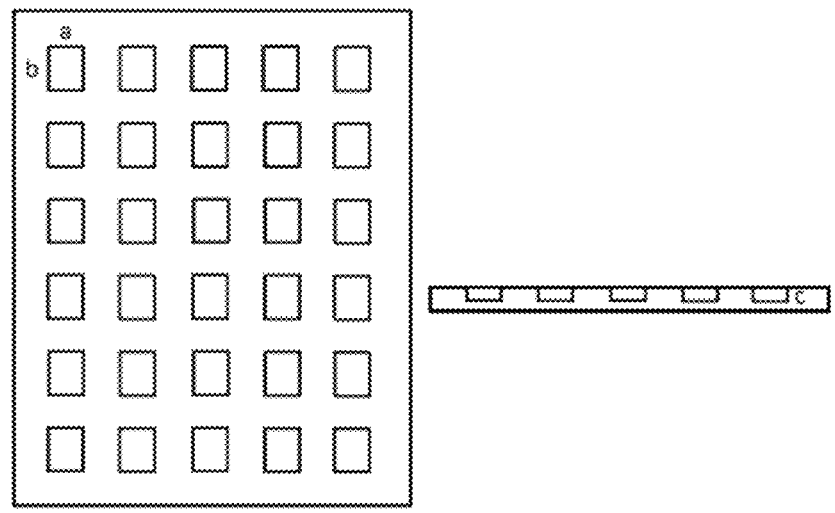
FIG. 7A is a top view of the cardboard structure.
FIG. 7B is a left view of the cardboard structure.

In order to conveniently place the corn seeds, a cardboard as shown in FIG. 7 is FIGS. 7A and 7B are designed with black background and engraved with 30 small grooves (the length a is 1.1 cm, the width b is 1.5 cm, the depth c is 0.15 cm) of cardboard. One corn seed is placed in each of the small groove of the cardboard. After a hyperspectral acquisition process, a hyperspectral image of 30 corn seeds can be collected.

When using a hyperspectral imaging system, the exposure time is set to 1 ms, the mobile platform moving speed is set to 2.6 mm/s. Before the hyperspectral image of the corn seeds is acquired, black and white field calibration is performed to eliminate the effects of dark current noise.

In the acquisition of hyperspectral image, the corn seeds are evenly placed on the cardboard as shown in FIG. 3A. The mobile platform is controlled to drive the corn seed samples into the field of view of the lens. Each time, a hyperspectral image consisting of 477 gray images of 477 wavebands of 30 corn seeds can be collected. After the end of one acquisition process, the mobile platform is returned to the original acquisition position. The resolution of each image is 672×1000. The acquired hyperspectral image will be saved to a computer for subsequent steps.

100 pixels in the embryo region and endosperm region of each corn seed in the hyperspectral image (three corn seeds in this example) are selected by using ENVI 4.6 software, which is a total of 600 pixels as the region of interest as shown in FIG. 3A. The corn seed in the first upper left position of FIG. 3A is selected as an example. In FIG. 3B, the gray filled area with white square and the black filled area with white square represent the regions of interest of the embryo region and the endosperm region, respectively.

Comparing the average spectral values of the pixels in the embryo region and the endosperm region in the same hyperspectral image in FIG. 3B, the result shown in FIG. 4. A gray image with two average spectral values that differ by more than 1000 and the gray value of the embryo region is greater than 0.75 and the gray value of the endosperm region is less than 0.2 is selected. Specifically, a gray image in 500 nm waveband is taken as shown in FIG. 5A. The image processing is performed on the gray image in the 500 nm waveband, including threshold segmentation, noise elimination and close operation, and the binary image with background removed and containing only the grain seed embryo region is obtained, as shown in FIG. 5B. A hyperspectral image of the grain seed embryo region is obtained by masking the hyperspectral image of the grain seed obtained in step 1) using the binary image.

Figure 6:
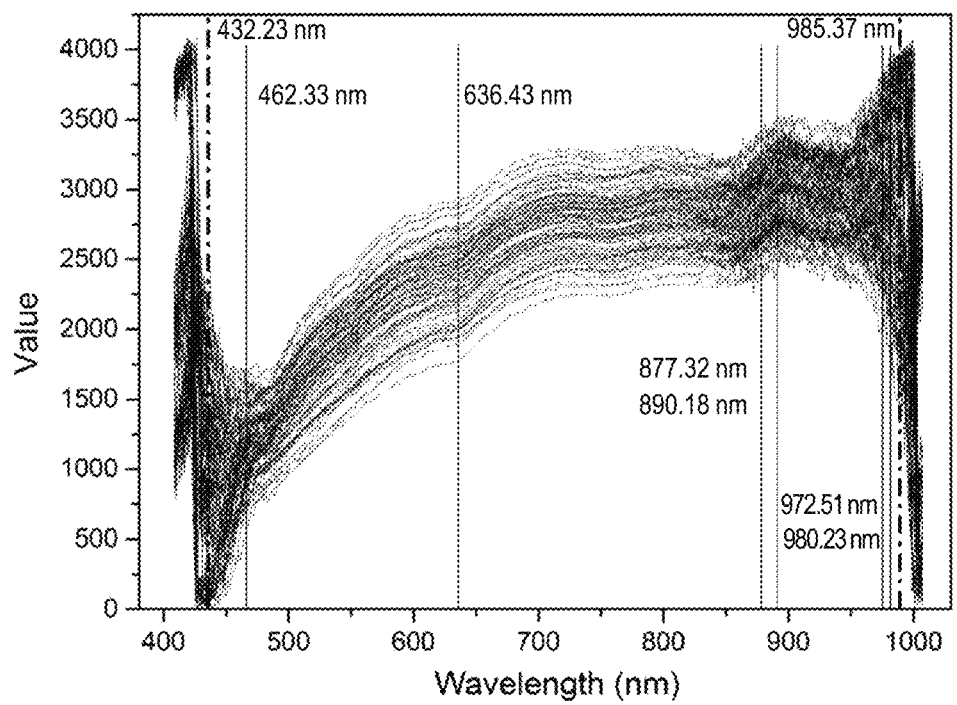
FIG. 6 is a graph showing the average spectra of the embryo hyperspectral image of each corn seed.

The average spectra of the hyperspectral image of the embryo are calculated as shown in FIG. 6. The first 20 wavebands (the wavebands before 432.23 nm) and the last 17 wavebands (the wavebands after 985.37 nm) are excluded from the 477 wavebands. The SPA algorithm is used to extract the feature wavebands of the remaining 440 wavebands. A total of seven feature wavebands of 636.43 nm, 972.51 nm, 432.23 nm, 462.33 nm, 877.32 nm, 980.23 nm, and 890.18 nm are selected.

Divide the grain seeds with known frostbite category into multiple batches. Process each batch of grain seeds to obtain the 7 feature waveband spectral values of the seed embryo region of the three categories, input the spectral values and category label into the Linear SVM to establish a classification model for training, and the trained Linear SVM is used to establish a classification model.

The feature waveband spectral values of grain seeds with unknown frostbite category are obtained by repeating the above steps, and then input into the trained Linear SVM to obtain frostbite condition of the grain seeds to be identified.

According to the foregoing description, label 1 represents normal corn seed, label 2 represents corn seed suffering from slight frostbite, label 3 represents corn seed suffering from severe frostbite. The classification result of 1 indicates that the corn seed is a normal seed and does not suffer from frostbite; a classification result of 2 indicates that the corn seed suffered a slight frostbite; a classification result of 3 indicates that the corn seed suffered severe frostbite.

In this embodiment, the hyperspectral image of the grain seed embryo is obtained by using the image processing method. The feature wavebands of spectra in the embryo region is extracted by related algorithm. In the frostbite condition detection of the corn seeds, the classification model has a good performance, which the classification accuracy rate between the three categories of frostbite damage can reach 99%.

Thus it can be concluded that the invention can be used to obtain the hyperspectral image of grain seed embryo and the relevant feature wavebands of the hyperspectral image and classify the seeds with frostbite, which has the advantages of non-destructive, good classification performance, high reliability and strong practicability.

The above-described embodiments are intended to be illustrative of the present invention, and are not intended to limit the scope of the present invention. Various changes and modifications can be made by those skilled in the art without departing from the spirit and scope of the invention, and therefore all equivalent technical solutions are also within the scope of the present invention. The patent protection scope of the present invention should be defined by the claims.

What is claimed is:

1. A method for identifying frostbite condition of a grain seed using spectral feature waveband of grain seed embryo hyperspectral images, comprising the following steps:
   1) collecting the hyperspectral image in an embryo side of the grain seed, which composed of gray images of different wavebands;
   2) obtaining the hyperspectral image in the embryo region of the grain seed by processing the collected hyperspectral image;
   3) obtaining an average value of each of the gray image in an embryo region of the grain seed, forming an average spectra with different wavebands, eliminating the wavebands with noise in the average spectra, and using a successive projection algorithm to extract the feature wavebands and obtain a corresponding spectral value of the average spectra;
   4) dividing the grain seeds with known frostbite category into multiple batches, repeating each of the above steps 1) to 2) to obtain the feature wavebands and the spectral values of the feature wavebands of the grain seeds, and then inputting the feature wavebands and the spectral values of the feature wavebands of the grain seeds into a classification model for obtaining an optimal training classification model;

5) repeating the above steps 1) to 2) to obtain the feature wavebands and the spectral values of the grain seeds with unknown category, and then inputting the feature wavebands and the spectral values of the feature wavebands of the grain seeds into the optimal trained classification model to obtain the frostbite category of the grain seed.

2. The method for identifying the frostbite condition of the grain seed using the spectral feature waveband of the grain seed embryo hyperspectral images according to the claim 1, wherein in the step 1), the embryo side of the grain seed is facing up with a light source, the gray images of the grain seed in K wavebands are collected by a camera, the K-gray images are composed of a hyperspectral image, and K is a positive integer.

3. The method for identifying the frostbite condition of the grain seed using the spectral feature waveband of the grain seed embryo hyperspectral images according to the claim 1, wherein in the step 1), the embryo side of the grain seed is irradiated with two line tungsten halogen lamps to collect the hyperspectral image.

4. The method for identifying the frostbite condition of the grain seed using the spectral feature waveband of the grain seed embryo hyperspectral images according to the claim 1, wherein the step 2) comprises:

2.1) extracting the embryo region and an endosperm region of the grain seed in the hyperspectral image as a region of interest, and calculating an average spectral value of all pixels in the region of interest in each of the gray image;

2.2) comparing the average spectral values of the embryo region and the endosperm region in the same gray image, selecting a gray image whose two average spectral values differs by more than 1000 and a gray value of the embryo region is greater than 0.75 and a gray value of the endosperm region is less than 0.2;

2.3) obtaining a binary image containing only the embryo region of the grain seed using image processing methods, and the hyperspectral image of the embryo side of the grain seed obtained in the step 1) is masked by the binary image, thus obtaining an embryo hyperspectral image.

5. The method for identifying the frostbite condition of the grain seed using the spectral feature waveband of the grain seed embryo hyperspectral images according to the claim 4, wherein in the step 2.3), the image processing methods comprises threshold segmentation, noise elimination, and close operations performed in sequence.

6. The method for identifying the frostbite condition of the grain seed using the spectral feature waveband of the grain seed embryo hyperspectral images according to the claim 1, wherein in the step 3), the spectral range after the noise wavebands of the gray image being removed from the hyperspectral image is 432.23-985.37 nm.

7. The method for identifying the frostbite condition of the grain seed using the spectral feature waveband of the grain seed embryo hyperspectral images according to the claim 1, wherein in the step 4), the classification model is a Linear SVM classification model.

8. The method for identifying the frostbite condition of the grain seed using the spectral feature waveband of the grain seed embryo hyperspectral images according to the claim 1, wherein the frostbite condition of the grain seeds is classified into three categories: normal, slight frostbite and severe frostbite.

9. The method for identifying the frostbite condition of the grain seed using the spectral feature waveband of the grain seed embryo hyperspectral images according to the claim 2, wherein the frostbite of the grain seed is determined according to germination rate, if a grain seed batch has a germination rate of more than 85%, the grain seed batch is classified into a normal category; if the grain seed batch has the germination rate of 51-84%, the grain seed batch is classified into a slight frostbite category; if the grain seed batch has the germination rate lower than 50%, the grain seed batch is classified into a severe frostbite category.

* * * * *